United States Patent
Vogel et al.

(10) Patent No.: US 12,123,393 B2
(45) Date of Patent: Oct. 22, 2024

(54) METHODS OF JOINING BLADE COMPONENTS OF WIND TURBINE ROTOR BLADES USING POSITIONING ELEMENTS

(71) Applicant: General Electric Company, Schenectady, NY (US)

(72) Inventors: Ryan Eric Vogel, Greer, SC (US); James Robert Tobin, Simpsonville, SC (US); Lauren Laurer Watts, Lyman, SC (US); Collin Mckee Sheppard, Greenville, SC (US)

(73) Assignee: LM Wind Power A/S, Kolding (DK)

( * ) Notice: Subject to any disclaimer, the term of this patent is extended or adjusted under 35 U.S.C. 154(b) by 0 days.

(21) Appl. No.: 18/521,256

(22) Filed: Nov. 28, 2023

(65) Prior Publication Data

US 2024/0093671 A1   Mar. 21, 2024

Related U.S. Application Data

(62) Division of application No. 17/768,634, filed as application No. PCT/US2019/056184 on Oct. 15, 2019, now Pat. No. 11,867,146.

(51) Int. Cl.
*F03D 13/10*  (2016.01)
*F03D 1/06*  (2006.01)

(52) U.S. Cl.
CPC ........... *F03D 13/10* (2016.05); *F03D 1/0641* (2013.01); *F05B 2230/232* (2013.01); *F05B 2230/604* (2013.01); *F05B 2240/301* (2013.01); *F05B 2240/302* (2013.01); *F05B 2280/4007* (2013.01)

(58) Field of Classification Search
CPC .......... F05B 2280/4007; F05B 2260/60; F05B 2240/301; F05B 2240/302; F05B 2230/232; F05B 2230/604; F05B 2230/60; F03D 1/0641; F03D 1/0675; F03D 13/10
See application file for complete search history.

(56) References Cited

U.S. PATENT DOCUMENTS

| 2017/0057158 A1 | 3/2017 | Caruso et al. |
| 2019/0153994 A1 | 5/2019 | Tobin et al. |

FOREIGN PATENT DOCUMENTS

| GB | 2488099 A | 8/2012 |
| WO | WO 2014/001567 A1 | 1/2014 |
| WO | WO 2016/026498 A1 | 2/2016 |
| WO | WO 2016/184472 A1 | 11/2016 |

*Primary Examiner* — Moshe Wilensky
(74) *Attorney, Agent, or Firm* — Dority & Manning, P.A.

(57) ABSTRACT

A method of joining first and second blade components of a rotor blade of a wind turbine includes providing corresponding first and second positioning elements at an interface of the first and second blade components. The method also includes aligning and securing the first positioning element of the first blade component with the second positioning element of the second blade component so as to temporarily secure the first and second blade components together. Further, the corresponding first and second positioning elements maintain a desired spacing between the first and second blade components. Moreover, the method includes permanently securing the first and second blade components together such that the desired spacing is maintained between the first and second blade components.

18 Claims, 11 Drawing Sheets

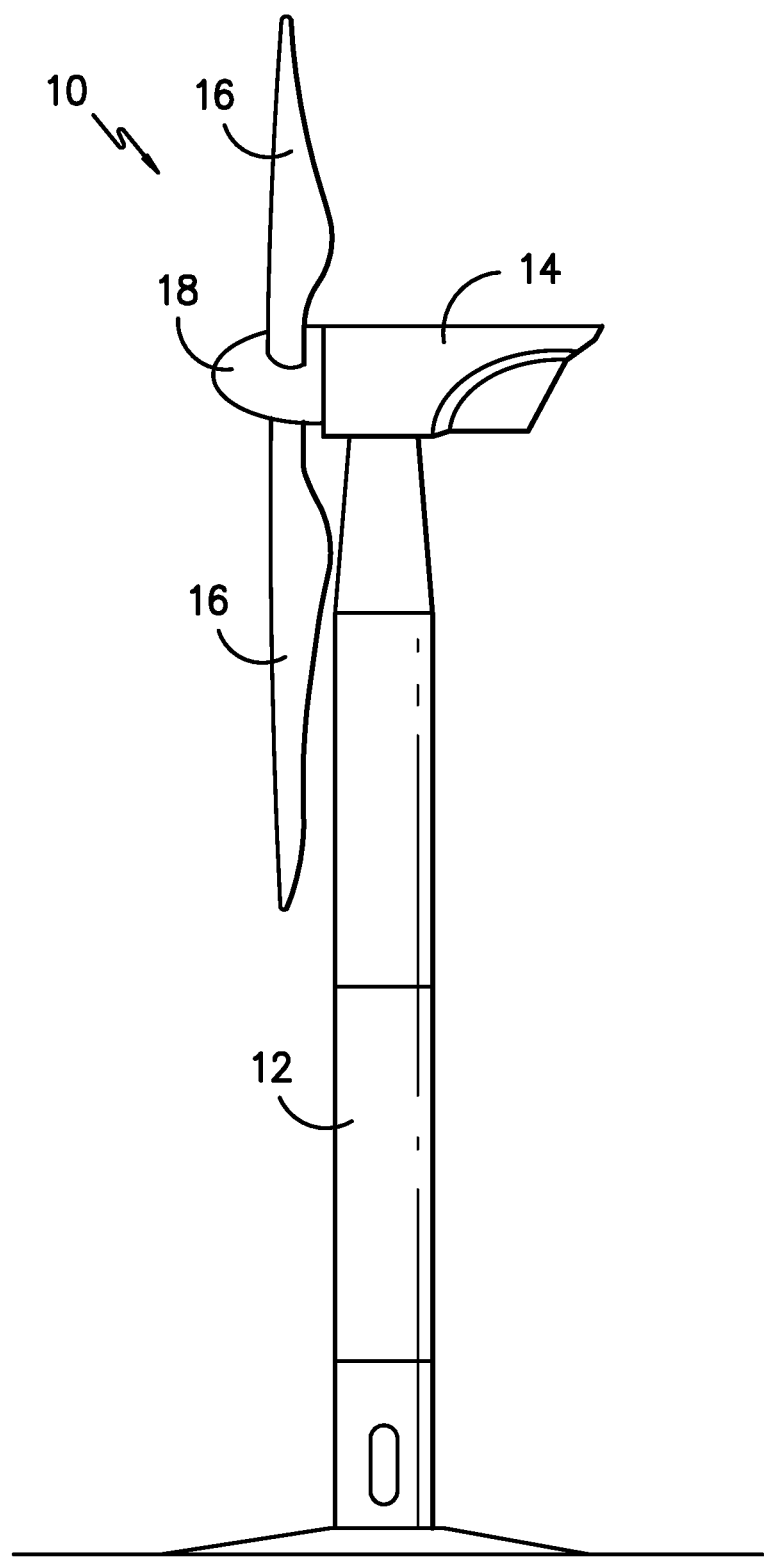
FIG. -1-

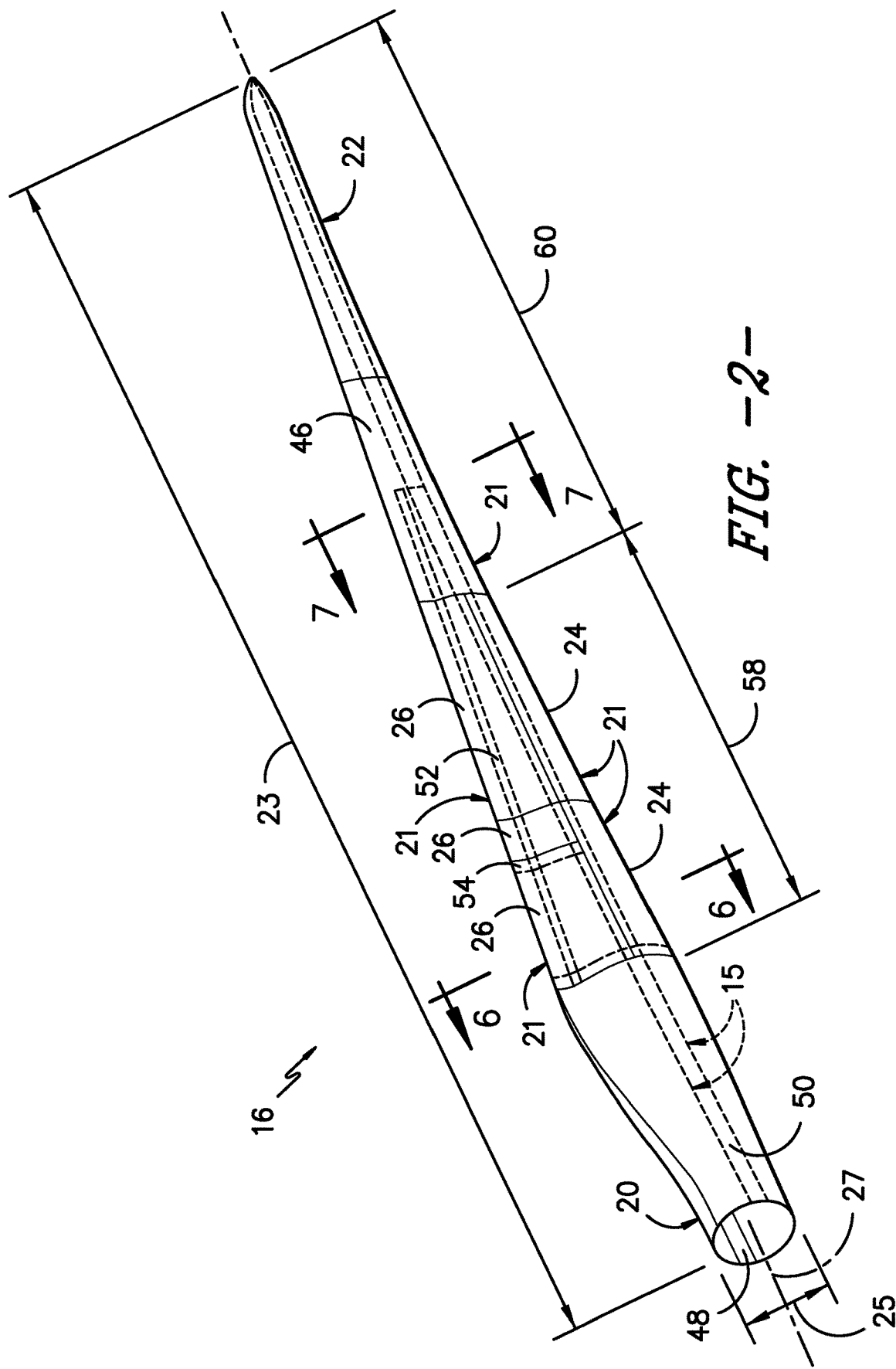

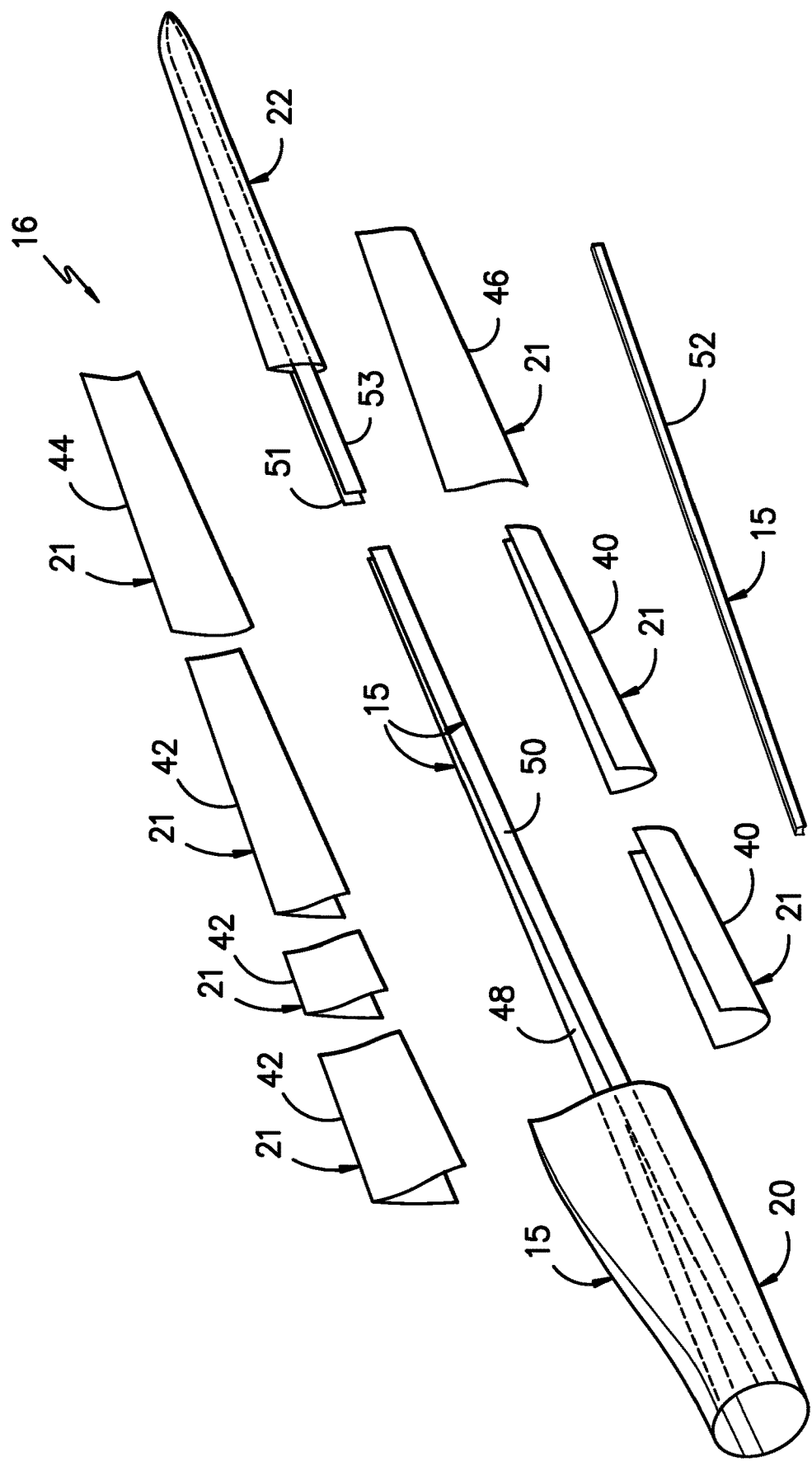
FIG. -3-

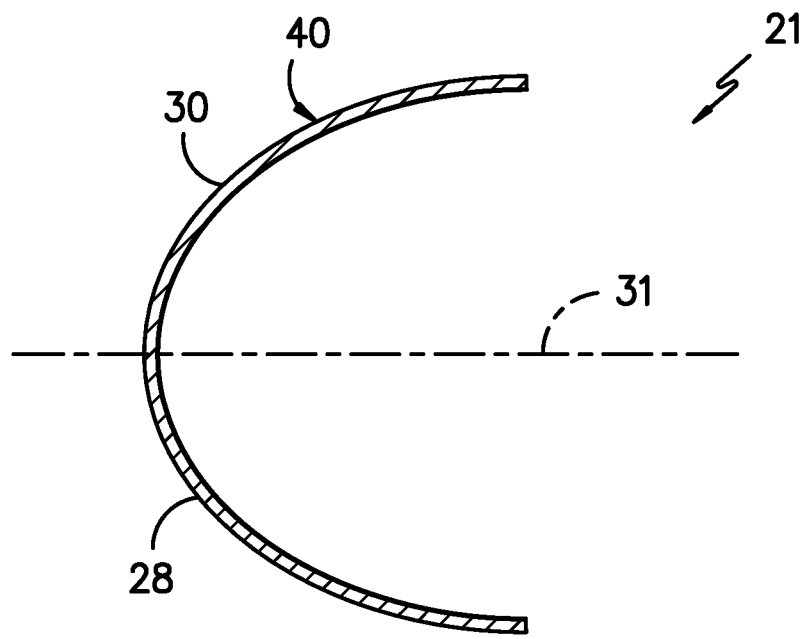
FIG. -4-
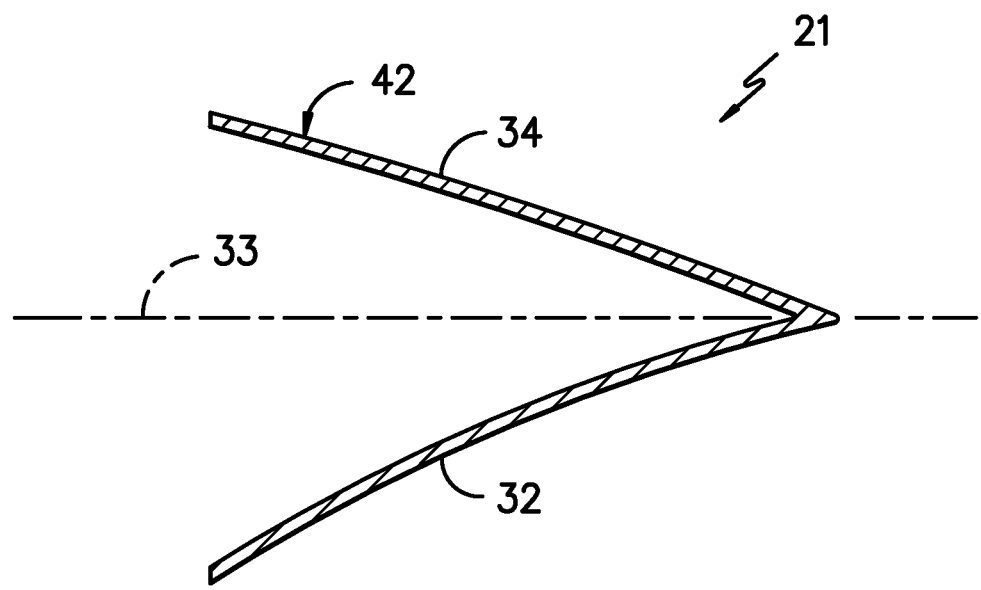
FIG. -5-

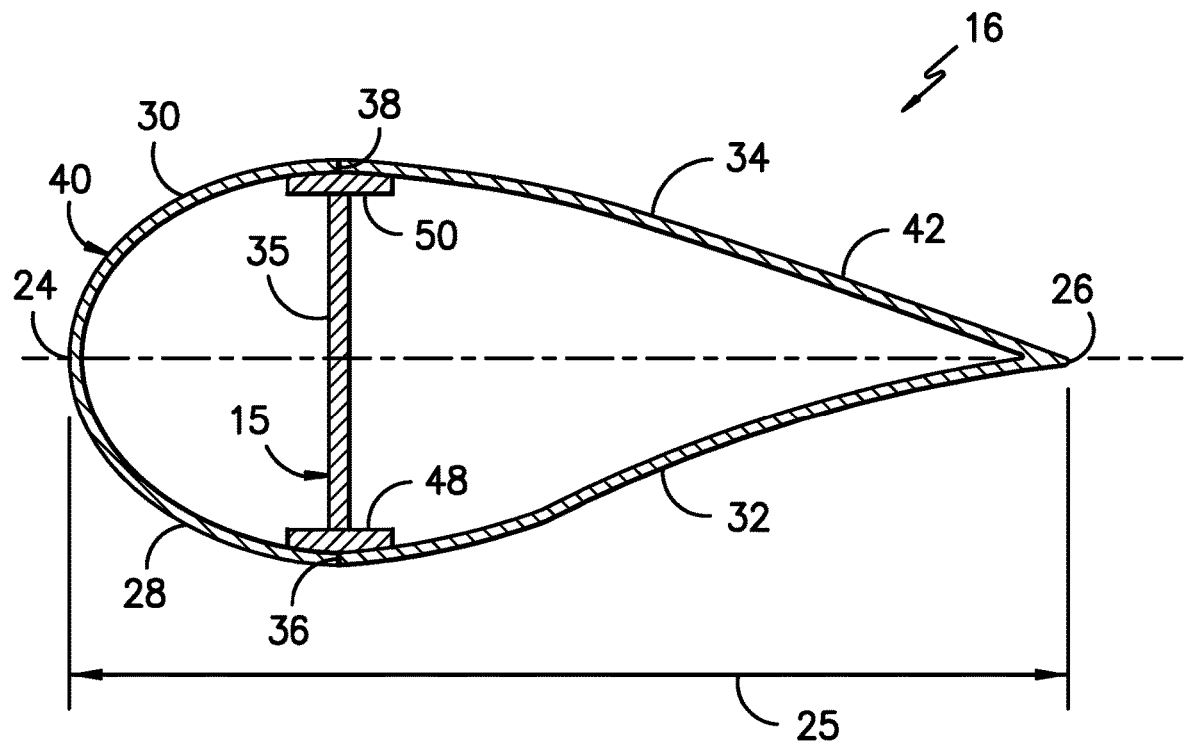
FIG. -6-
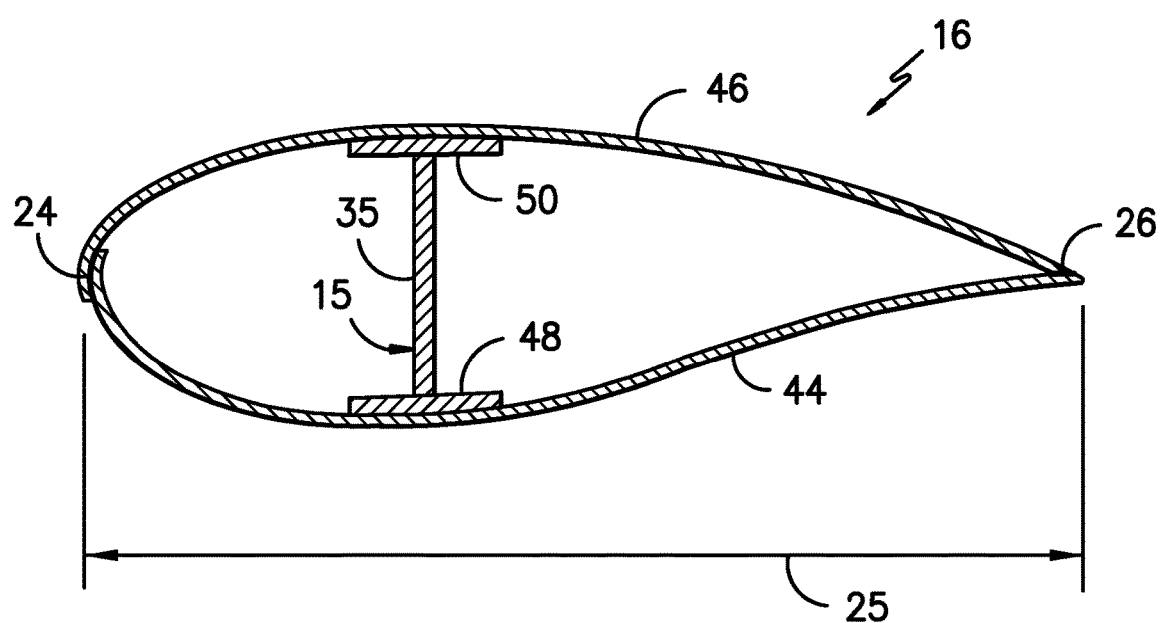
FIG. -7-

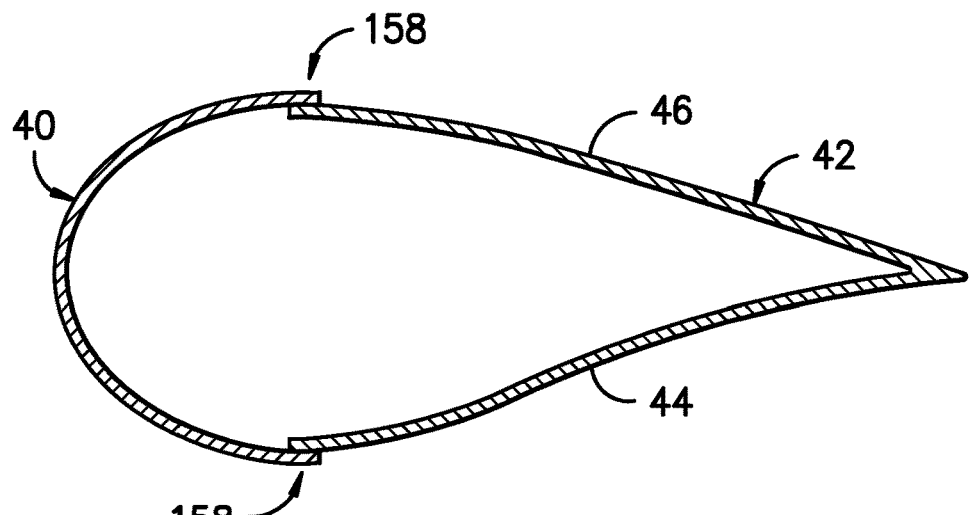
FIG. -8A-
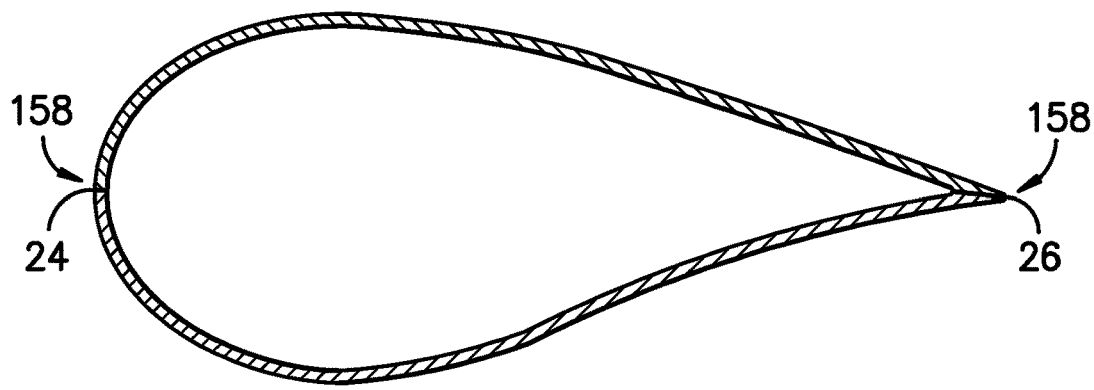
FIG. -8B-
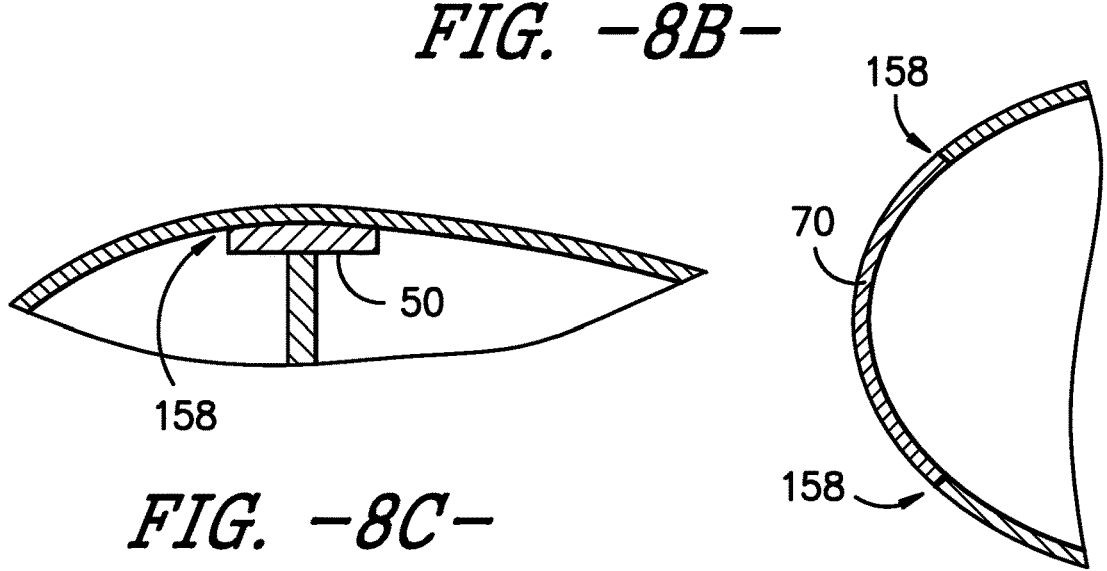
FIG. -8C-
FIG. -8D-

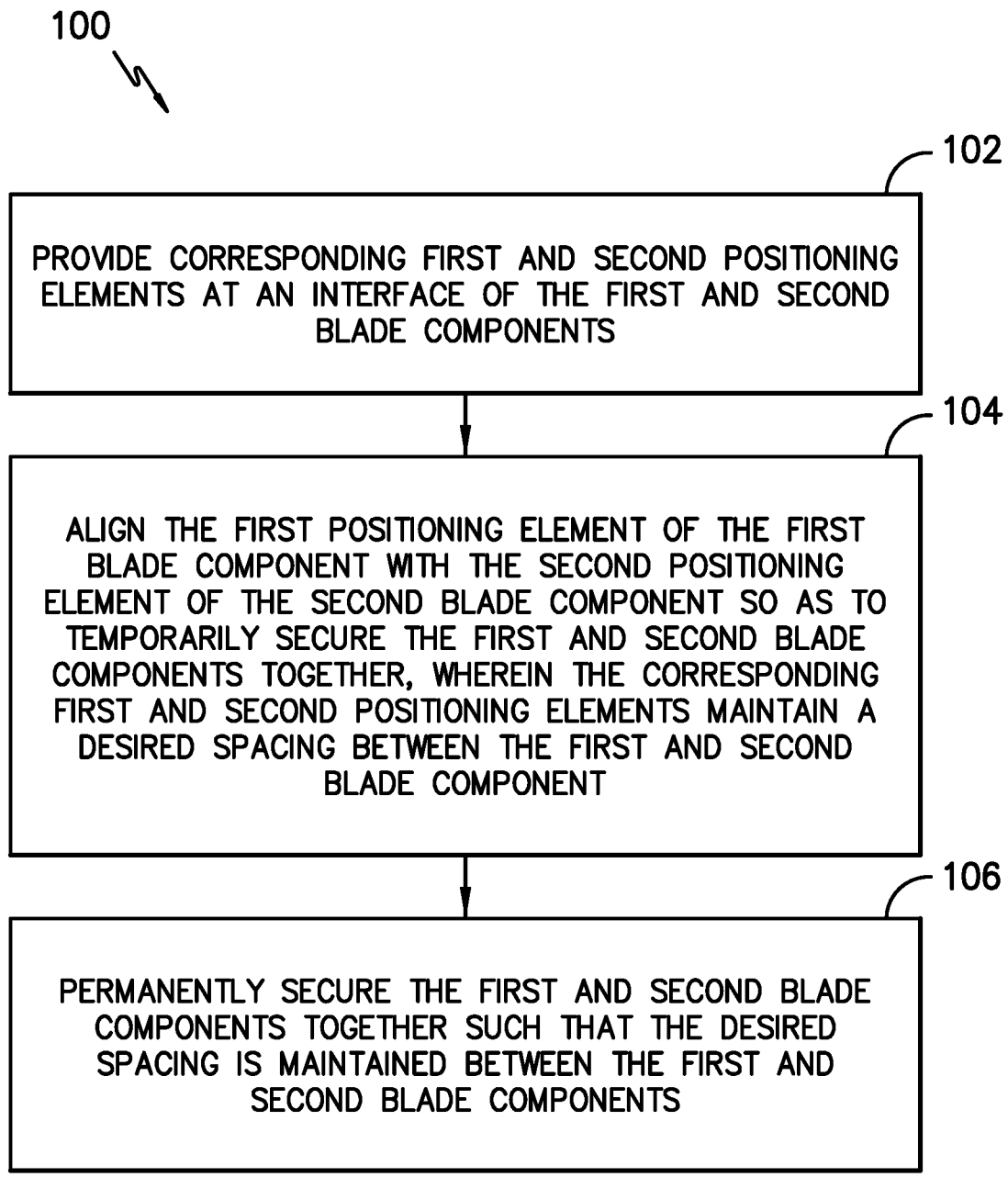
FIG. -9-

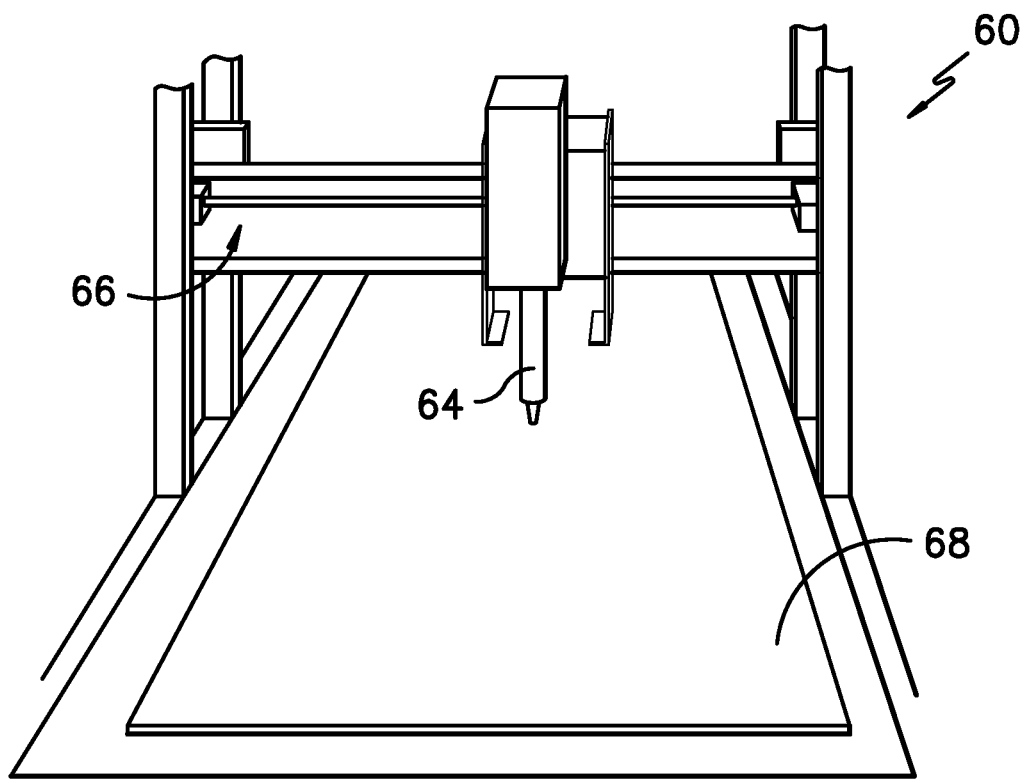
FIG. -10-

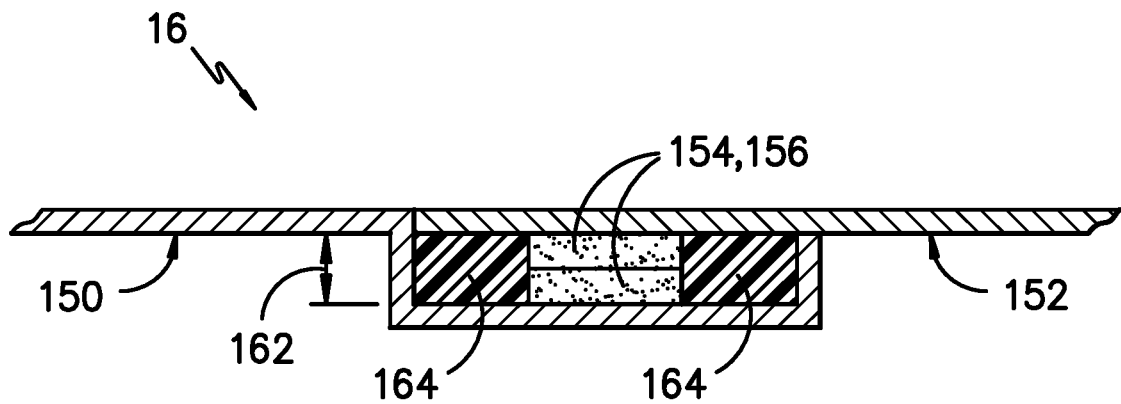
FIG. -11-
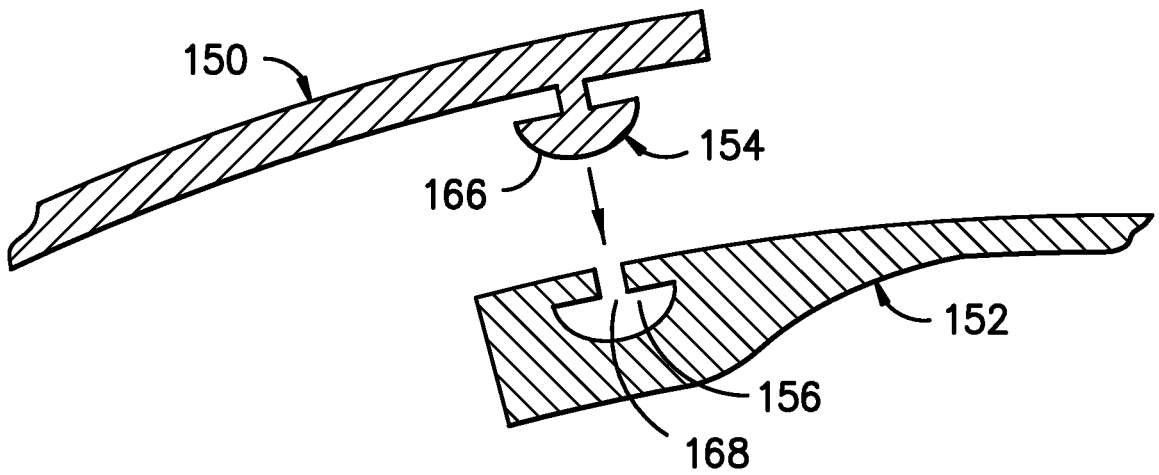
FIG. -12-

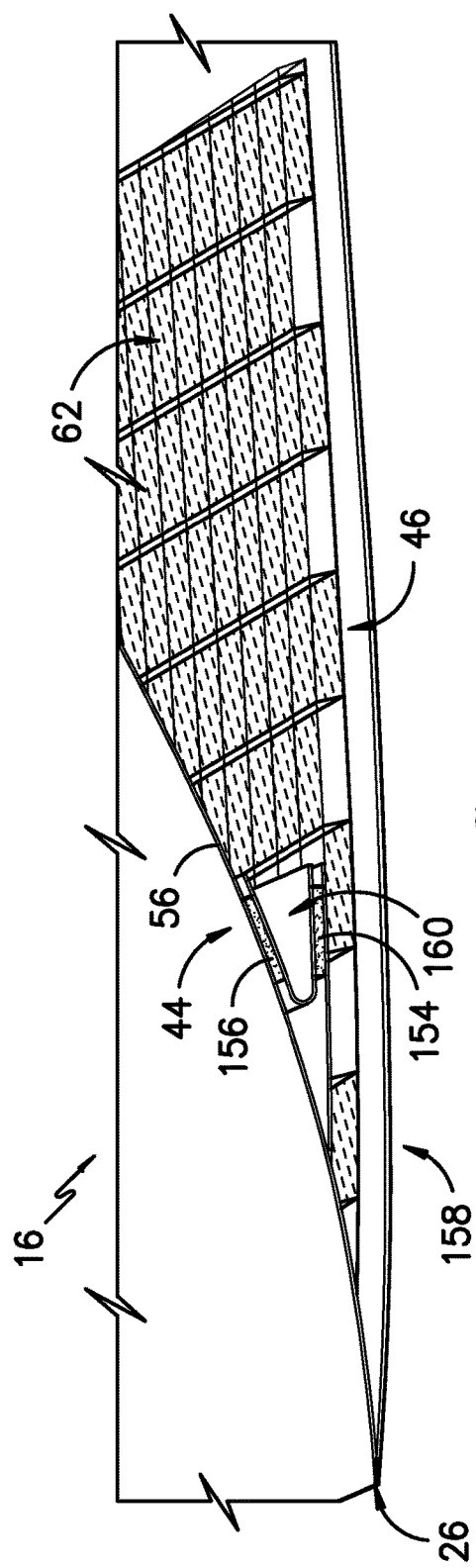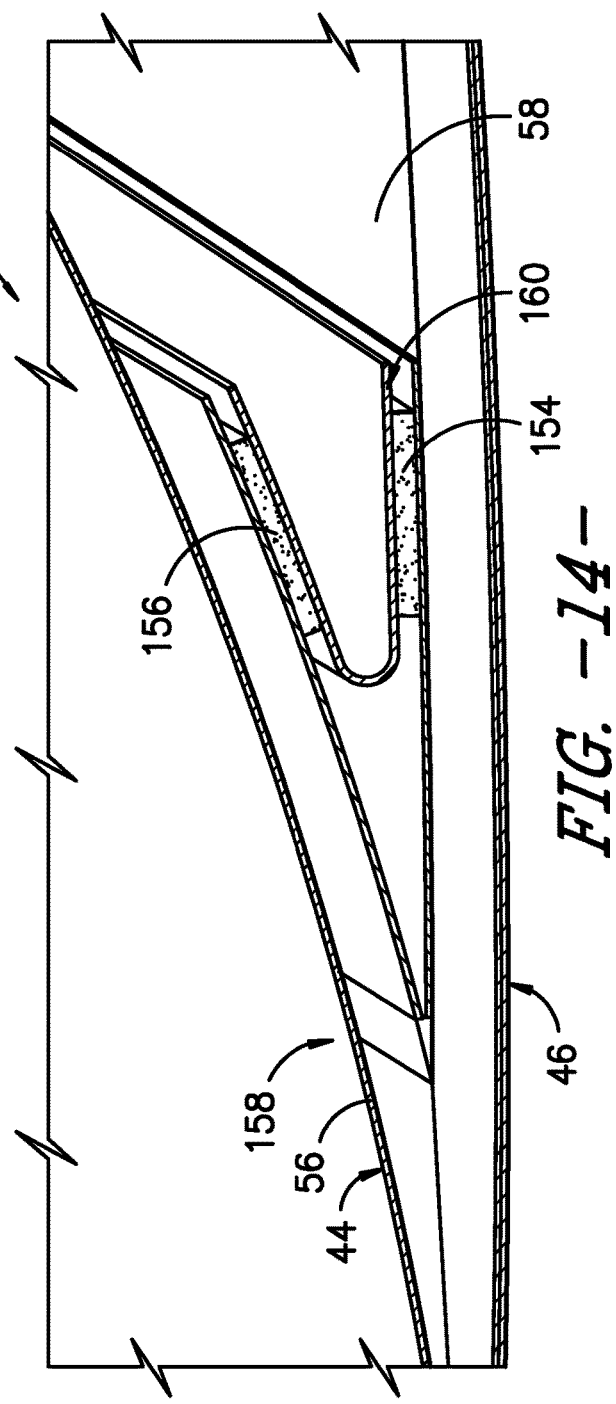

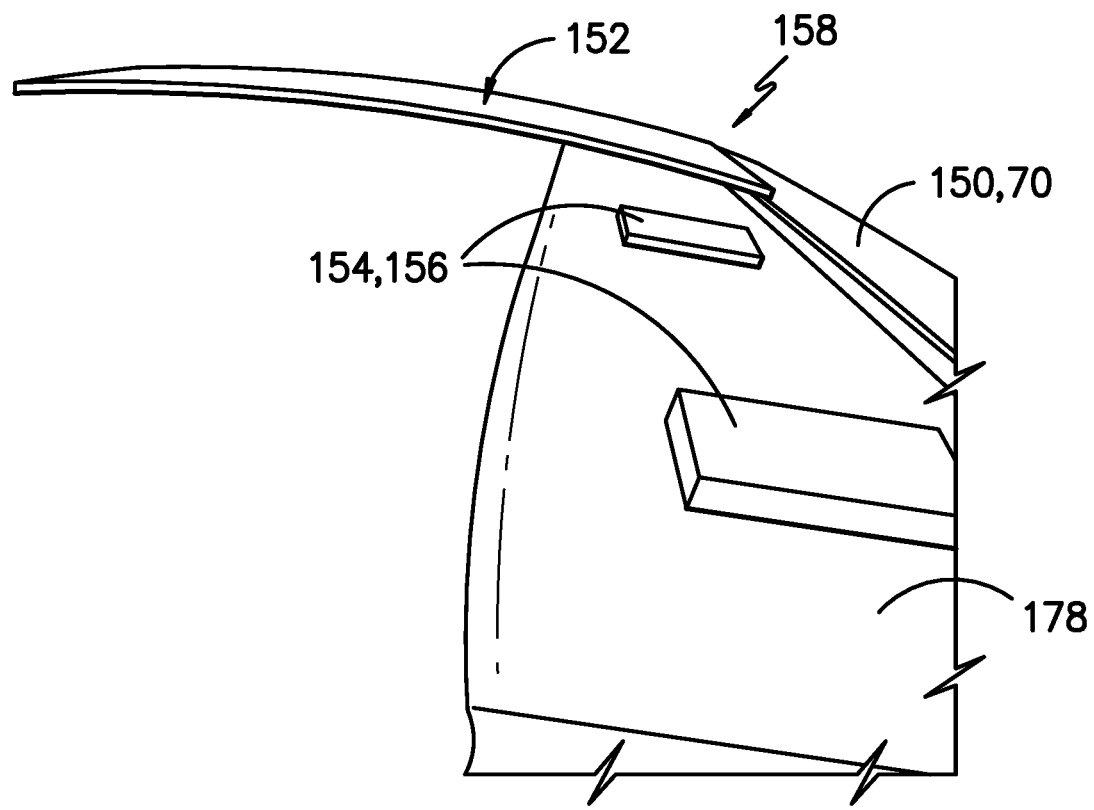
FIG. -15-
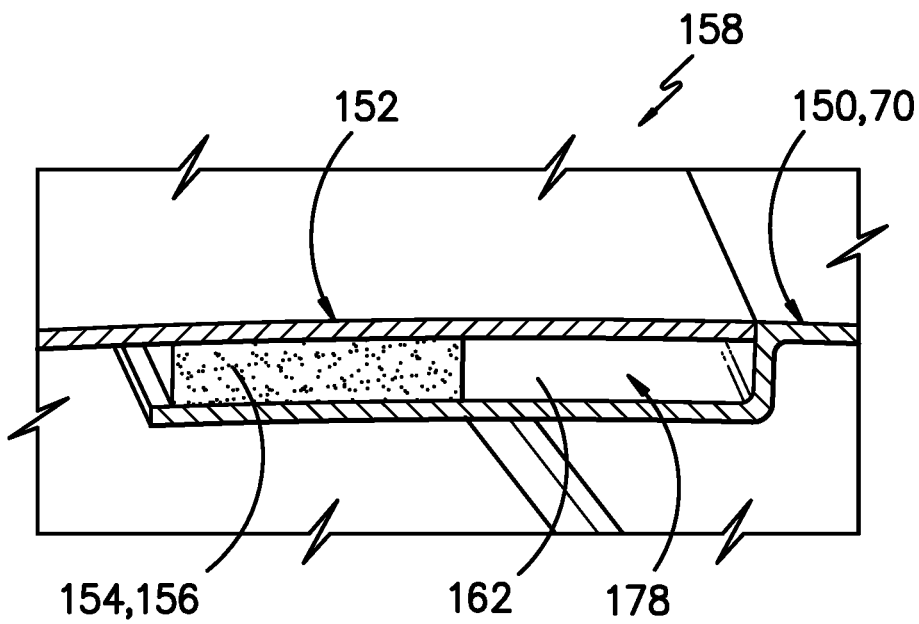
FIG. -16-

METHODS OF JOINING BLADE COMPONENTS OF WIND TURBINE ROTOR BLADES USING POSITIONING ELEMENTS

RELATED APPLICATIONS

The present application is a divisional of and claims priority to U.S. application Ser. No. 17/768,634 having a filing date of Apr. 13, 2022, which claims priority to PCT Application Serial Number PCT/US2019/056184, filed on Oct. 15, 2019, both of which are incorporated by reference in their entirety herein.

FIELD

The present disclosure relates generally to wind turbines, and more particularly to methods of joining blade components of a rotor blade of a wind turbine using recloseable fasteners that both align and hold the first and second blade components in place during assembly.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance, and strength of the rotor blade, the body shell is typically reinforced using one or more structural components (e.g., opposing spar caps with a shear web configured therebetween) that engage the inner pressure and suction side surfaces of the shell halves. The spar caps and/or shear web may be constructed of various materials, including but not limited to glass fiber laminate composites and/or carbon fiber laminate composites. Many rotor blades often also include a leading edge bond cap positioned at the leading edge of the rotor blade between the suction side and pressure side shells.

The suction side and pressure side shells of the blade are generally flexible. Thus, while bonding the leading edge cap to the suction side and pressure side shells with adhesive, constant load needs to be applied while the adhesive sets. Therefore, one issue with this method is that the bond gap between the shells is inconsistent and difficult to control. Further, for typical applications, highly viscous adhesives are used, which result in significant hydraulic pressure resistance as mating components are brought together. Moreover, a substantial amount of adhesive is used to ensure gaps are filled, which adds to the costs and weight of the rotor blade.

Accordingly, the present disclosure is directed to methods of joining blade components of a rotor blade of a wind turbine using recloseable fasteners that both align and hold the first and second blade components in place during assembly so as to address the aforementioned issues.

BRIEF DESCRIPTION

Aspects and advantages of the invention will be set forth in part in the following description, or may be obvious from the description, or may be learned through practice of the invention.

In one aspect, the present disclosure is directed to a method of joining first and second blade components of a rotor blade of a wind turbine. The method includes providing corresponding first and second positioning elements at an interface of the first and second blade components. The method also includes aligning and securing the first positioning element of the first blade component with the second positioning element of the second blade component so as to temporarily secure the first and second blade components together. Further, the corresponding first and second positioning elements maintain a desired spacing between the first and second blade components. Moreover, the method includes permanently securing the first and second blade components together such that the desired spacing is maintained between the first and second blade components.

In an embodiment, the first and second blade components of the rotor blade may include a rotor blade shell, a spar cap, a leading edge, a trailing edge, or combinations thereof. For example, in an embodiment, the rotor blade shell may include a pressure side shell or a suction side shell.

More specifically, in a particular embodiment, the first and second blade components may include the pressure side shell and the suction side shell and the interface may include trailing edge of the rotor blade. In such embodiments, the method may include providing a V-shaped component at the trailing edge, such as e.g. via placing or securing via an adhesive, printing, etc. In such embodiments, the method may also include placing the corresponding first and second positioning elements on one or more sides of the V-shaped component. For example, in one embodiment, the first positioning element may be secured to the suction side shell and the second positioning element may be secured to the pressure side shell. In alternative embodiments, the first and second positioning elements may be secured to the same shell.

In further embodiments, the corresponding positioning elements may be recloseable fasteners, hook-and-loop fasteners, snap-fit fasteners, opposing sides of double-sided tape, one or more bump stops, and/or combinations thereof. In another embodiment, the corresponding positioning elements may be constructed from a thermoplastic material.

In additional embodiments, providing the corresponding first and second positioning elements at the interface of the first and second blade components may include printing the corresponding first and second positioning elements at the interface, adhering the corresponding first and second positioning elements at the interface, or inserting the corresponding first and second positioning elements at the interface.

In an embodiment, aligning and securing the first positioning element of the first blade component with the second positioning element of the second blade component so as to temporarily secure the first and second blade components together may include manually aligning and securing the first positioning element of the first blade component with the second positioning element or aligning and securing the first positioning element of the first blade component with the second positioning element via machinery.

In another embodiment, the method may include permanently securing the first and second blade components together via an adhesive. For example, in one embodiment, permanently securing the first and second blade components together via the adhesive may include aligning the corresponding first and second positioning elements together and after aligning and without allowing the aligned first and second positioning elements to move, injecting the adhesive into one or more gaps created by the desired spacing.

In another embodiment, the method may include, before injecting the adhesive, inspecting the aligned first and second positioning elements before injecting the adhesive; and, if alignment of the first and second positioning elements is not sufficient, repositioning the first and second blade components by detaching one or more of the first and second positioning elements to allow for realignment. In addition, the method may include realigning the first and second blade components and temporarily reattaching the first and second positioning elements and reinspecting the alignment.

Moreover, in an embodiment, the aligned first and second positioning elements are configured to provide and maintain smooth external mating surfaces between the first and second blade components.

In alternative embodiments, the method may include permanently securing the first and second blade components together via welding. For example, in one embodiment, permanently securing the first and second blade components together via the welding may include welding the corresponding first and second positioning elements together and subsequently welding the first and second blade components together.

In another embodiment, the corresponding first and second positioning elements remain part of the rotor blade, e.g. when the method is complete. In yet another embodiment, the corresponding first and second positioning elements are internal of an outer aerodynamic surface of the rotor blade.

In another aspect, the present disclosure is directed to a rotor blade for a wind turbine. The rotor blade includes a first blade component, a second blade component secured to the first blade component at an interface, and at least one positioning element positioned at the interface of the first and second blade components. The positioning element(s) temporarily secures the first and second blade components together during assembly of the first and second blade components and then remains part of the rotor blade when the assembly of the first and second blade components is complete. Further, the positioning element(s) maintains a desired spacing between the first and second blade components during assembly of the first and second blade components and in the rotor blade. It should be understood that the rotor blade may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective view of one embodiment of a rotor blade of a wind turbine according to the present disclosure;

FIG. 3 illustrates an exploded view of the modular rotor blade of FIG. 2;

FIG. 4 illustrates a cross-sectional view of one embodiment of a leading edge segment of a modular rotor blade according to the present disclosure;

FIG. 5 illustrates a cross-sectional view of one embodiment of a trailing edge segment of a modular rotor blade according to the present disclosure;

FIG. 6 illustrates a cross-sectional view of the modular rotor blade of FIG. 2 according to the present disclosure;

FIG. 7 illustrates a cross-sectional view of the modular rotor blade of FIG. 2 according to the present disclosure;

FIG. 8A illustrates a cross-sectional view of one embodiment of a rotor blade according to the present disclosure, particularly illustrating example interface locations on the pressure and suction side shells of the rotor blade;

FIG. 8B illustrates a cross-sectional view of one embodiment of a rotor blade according to the present disclosure, particularly illustrating example interface locations at the leading and trailing edges of the rotor blade;

FIG. 8C illustrates a cross-sectional view of one embodiment of a rotor blade according to the present disclosure, particularly illustrating example interface location between a spar cap and a rotor blade shell of the rotor blade;

FIG. 8D illustrates a cross-sectional view of one embodiment of a rotor blade according to the present disclosure, particularly illustrating an example interface location at the leading edge bond cap of the rotor blade;

FIG. 9 illustrates a flow diagram of one embodiment of a method of joining first and second blade components of a rotor blade of a wind turbine according to the present disclosure;

FIG. 10 illustrates a perspective view of one embodiment of a computer numeric control (CNC) device according to the present disclosure;

FIG. 11 illustrates a cross-sectional view of one embodiment of a rotor blade according to the present disclosure, particularly illustrating first and second blade components being permanently secured together via an adhesive;

FIG. 12 illustrates a schematic diagram of one embodiment of a rotor blade according to the present disclosure, particularly illustrating first and second blade components being secured together via positioning elements that can be subsequently permanently secured together via welding;

FIG. 13 illustrates a schematic diagram of one embodiment of a rotor blade according to the present disclosure, particularly illustrating a trailing edge of the rotor blade having a V-shaped component secured in place via a plurality of Velcro strips;

FIG. 14 illustrates a detailed cross-sectional view of the trailing edge of the rotor blade of FIG. 13;

FIG. 15 illustrates a partial, perspective view of one embodiment of a rotor blade according to the present disclosure, particularly illustrating a plurality of Velcro strips placed within a recess of a leading edge bond cap; and FIG. 16 illustrates a cross-sectional view of a portion of the leading edge bond cap of FIG. 15.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to methods of assembling rotor blade components using a Velcro/hook-and-loop fastener system, in which the fastener system acts as a fastener and a spacer between the blade components. Thus, the fastener system provides preparation for assembly fit-up, load distribution as other adhesives set, and a spacer to maintain control of the bond gap.

Alternative methods may also include welding or adhering snap-fit components together, e.g. to the opposing components. This could be done manually, through specialized machinery, or through the blade printing gantry. Thus, the snap-fit components of the present disclosure ensure components are in correct alignment with respect to each other as the components only snap together if both components are properly aligned. This could either be used as a temporary bond to hold components as adhesives cure, as part of a permanent assembly, or as a permanent assembly by welding the two halves together. In still further embodiments, spacers that work as bump stops may also be inserted or printed into the blade. These give a clearance between parts based on their height and force parts in alignment by preventing motion when a feature is pushed against the spacer horizontally.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application using resin materials. Further, the methods described herein may also apply to manufacturing any similar structure that benefits from the resin formulations described herein.

Referring now to FIGS. 2 and 3, various views of a rotor blade 16 according to the present disclosure are illustrated. As shown, the illustrated rotor blade 16 has a segmented or modular configuration. It should also be understood that the rotor blade 16 may include any other suitable configuration now known or later developed in the art. As shown, the modular rotor blade 16 includes a main blade structure 15 and at least one blade segment 21 secured to the main blade structure 15. More specifically, as shown, the rotor blade 16 includes a plurality of blade segments 21.

More specifically, as shown, the main blade structure 15 may include any one of or a combination of the following: a pre-formed blade root section 20, a pre-formed blade tip section 22, one or more one or more continuous spar caps 48, 50, 51, 53, one or more shear webs 35 (FIGS. 6-7), an additional structural component 52 secured to the blade root section 20, and/or any other suitable structural component of the rotor blade 16. Further, the blade root section 20 is configured to be mounted or otherwise secured to the rotor 18 (FIG. 1). In addition, as shown in FIG. 2, the rotor blade 16 defines a span 23 that is equal to the total length between the blade root section 20 and the blade tip section 22. As shown in FIGS. 2 and 6, the rotor blade 16 also defines a chord 25 that is equal to the total length between a leading edge 24 of the rotor blade 16 and a trailing edge 26 of the rotor blade 16. As is generally understood, the chord 25 may generally vary in length with respect to the span 23 as the rotor blade 16 extends from the blade root section 20 to the blade tip section 22.

Referring particularly to FIGS. 2-4, any number of blade segments 21 or panels (also referred to herein as blade shells) having any suitable size and/or shape may be generally arranged between the blade root section 20 and the blade tip section 22 along a longitudinal axis 27 in a generally span-wise direction. Thus, the blade segments 21 generally serve as the outer casing/covering of the rotor blade 16 and may define a substantially aerodynamic profile, such as by defining a symmetrical or cambered airfoil-shaped cross-section.

In additional embodiments, it should be understood that the blade segment portion of the blade 16 may include any combination of the segments described herein and are not limited to the embodiment as depicted. More specifically, in certain embodiments, the blade segments 21 may include any one of or combination of the following: pressure and/or suction side segments 44, 46, (FIGS. 2 and 3), leading and/or trailing edge segments 40, 42 (FIGS. 2-6), a non-jointed segment, a single-jointed segment, a multi-jointed blade segment, a J-shaped blade segment, or similar.

More specifically, as shown in FIG. 4, the leading edge segments 40 may have a forward pressure side surface 28 and a forward suction side surface 30. Similarly, as shown in FIG. 5, each of the trailing edge segments 42 may have an aft pressure side surface 32 and an aft suction side surface 34. Thus, the forward pressure side surface 28 of the leading edge segment 40 and the aft pressure side surface 32 of the trailing edge segment 42 generally define a pressure side surface of the rotor blade 16. Similarly, the forward suction side surface 30 of the leading edge segment 40 and the aft suction side surface 34 of the trailing edge segment 42 generally define a suction side surface of the rotor blade 16. In addition, as particularly shown in FIG. 6, the leading edge segment(s) 40 and the trailing edge segment(s) 42 may be joined at a pressure side seam 36 and a suction side seam 38. For example, the blade segments 40, 42 may be configured to overlap at the pressure side seam 36 and/or the suction side seam 38. Further, as shown in FIG. 2, adjacent blade segments 21 may be configured to overlap at a seam 54. Alternatively, in certain embodiments, the various segments of the rotor blade 16 may be secured together via an adhesive (or mechanical fasteners) configured between the overlapping leading and trailing edge segments 40, 42 and/or the overlapping adjacent leading or trailing edge segments 40, 42.

In specific embodiments, as shown in FIGS. 2-3 and 6-7, the blade root section 20 may include one or more longitudinally extending spar caps 48, 50 infused therewith. For example, the blade root section 20 may be configured according to U.S. application Ser. No. 14/753,155 filed Jun. 29, 2015 entitled "Blade Root Section for a Modular Rotor Blade and Method of Manufacturing Same" which is incorporated herein by reference in its entirety.

Similarly, the blade tip section 22 may include one or more longitudinally extending spar caps 51, 53 infused therewith. More specifically, as shown, the spar caps 48, 50, 51, 53 may be configured to be engaged against opposing inner surfaces of the blade segments 21 of the rotor blade 16. Further, the blade root spar caps 48, 50 may be configured to align with the blade tip spar caps 51, 53. Thus, the spar caps 48, 50, 51, 53 may generally be designed to control the bending stresses and/or other loads acting on the rotor blade 16 in a generally span-wise direction (a direction parallel to the span 23 of the rotor blade 16) during operation of a wind turbine 10. In addition, the spar caps 48, 50, 51, 53 may be designed to withstand the span-wise compression occurring during operation of the wind turbine 10. Further, the spar cap(s) 48, 50, 51, 53 may be configured to extend from the blade root section 20 to the blade tip section 22 or a portion thereof. Thus, in certain embodiments, the blade root section 20 and the blade tip section 22 may be joined together via their respective spar caps 48, 50, 51, 53.

Referring to FIGS. 6-7, one or more shear webs 35 may be configured between the one or more spar caps 48, 50, 51, 53. More particularly, the shear web(s) 35 may be configured to increase the rigidity in the blade root section 20 and/or the blade tip section 22. Further, the shear web(s) 35 may be configured to close out the blade root section 20.

In addition, as shown in FIGS. 2 and 3, the additional structural component 52 may be secured to the blade root section 20 and extend in a generally span-wise direction so as to provide further support to the rotor blade 16. For example, the structural component 52 may be configured according to U.S. application Ser. No. 14/753,150 filed Jun. 29, 2015 entitled "Structural Component for a Modular Rotor Blade" which is incorporated herein by reference in its entirety. More specifically, the structural component 52 may extend any suitable distance between the blade root section 20 and the blade tip section 22. Thus, the structural component 52 is configured to provide additional structural support for the rotor blade 16 as well as an optional mounting structure for the various blade segments 21 as described herein. For example, in certain embodiments, the structural component 52 may be secured to the blade root section 20 and may extend a predetermined span-wise distance such that the leading and/or trailing edge segments 40, 42 can be mounted thereto.

Referring now to FIGS. 8A-8D and 9, the present disclosure is directed to systems and method of joining first and second blade components 150, 152 of the rotor blade 16 of the wind turbine 10 together. In certain embodiments, the blade components described herein may include, for example, a rotor blade shell (a pressure side shell, a suction side shell, a trailing edge segment, a leading edge segment, etc.), a spar cap, a leading edge bond cap, or combinations thereof, as well as any other rotor blade component. More particularly, as shown in FIGS. 8A-8D, chord-wise views of various embodiments of interface locations between the first and second blade components 150, 152 are illustrated to provide example locations of where the blade components can be joined. For example, FIG. 8A illustrates interface locations 158 on the pressure and suction side shells 44, 46. FIG. 8B illustrates interface locations 158 at the leading and trailing edges 24, 26. FIG. 8C illustrates an interface location 158 between a spar cap 50 and a rotor blade shell or segment. FIG. 8D illustrates an interface location 158 at the leading edge bond cap 70. Though FIGS. 8A-8D provide example locations wherein the first and second blade components 150, 152 can be joined together, the figures are provided for illustrative purposes only and are not meant to be limiting.

Referring now to FIG. 9, a flow diagram of one embodiment of method 100 of joining the first and second blade components 150, 152 of the rotor blade 16 is illustrated. In general, the method 100 is described herein as implemented for joining the rotor blade components described above. However, it should be appreciated that the disclosed method 100 may be used to assemble any other rotor blade components as well. In addition, although FIG. 9 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (102), the method 100 includes providing corresponding first and second positioning elements 154, 156 at an interface 158 of the first and second blade components 150, 152. For example, in an embodiment and as will be described in more detail herein, the corresponding positioning elements 154, 156 may be hook-and-loop fasteners (such as Velcro), snap-fit fasteners, opposing sides of double-sided tape, one or more bump stops, and/or combinations thereof. In addition, the corresponding first and second positioning elements 154 156 may be internal of an outer aerodynamic surface of the rotor blade 16 so as to not disrupt or interfere with the aerodynamic surface.

In another embodiment, wherein the corresponding positioning elements 154, 156 are snap-fit fasteners, the positioning elements 154, 156 may be constructed from a thermoplastic material. Alternatively, wherein the corresponding positioning elements 154, 156 correspond to hook-and-loop fasteners, the positioning elements 154, 156 may be corresponding Velcro strips. In an embodiment, the Velcro strips can be easily secured to the blade components, e.g. via double-sided tape. In yet another embodiment, as opposed to locking components together, the corresponding positioning elements 154, 156 may also act as a bump stop that can be inserted or printed into the rotor blade 16.

Accordingly, in certain embodiments, the corresponding first and second positioning elements 154, 156 may be printed at the interface 158 (e.g. via 3-D printing or any suitable additive manufacturing process). 3-D printing, as used herein, is generally understood to encompass processes used to synthesize three-dimensional objects in which successive layers of material are formed under computer control to create the objects. As such, objects of almost any size and/or shape can be produced from digital model data. It should further be understood that the methods of the present disclosure are not limited to 3-D printing, but rather, may also encompass more than three degrees of freedom such that the printing techniques are not limited to printing stacked two-dimensional layers, but are also capable of printing curved shapes. As such, any suitable computer numeric control (CNC) device may be used to print the positioning elements 154, 156, one example of which is provided in FIG. 10. For example, as shown, a schematic view of one embodiment of a CNC device 60 according to the present disclosure is illustrated. Further, as shown, the CNC device includes one or more extruders 64 mounted to a gantry 66 or frame structure such that the extruder 64 can move in multiple directions. In addition, the extruder(s) 64 is configured to deposit print material layer by layer onto a surface 68 or bed of the device 60 so as to build up an object.

Alternatively, the corresponding first and second positioning elements 154, 156 may be adhered to the interface 158 (e.g. via an adhesive or double-side tape). In yet another embodiment, the corresponding first and second positioning elements 154, 156 may be inserted at the interface 158 (e.g. via an interference fit).

Referring still to FIG. 9, as shown at (104), the method 100 includes aligning and securing the first positioning element 154 of the first blade component 150 with the second positioning element 156 of the second blade component 152 so as to temporarily secure the first and second blade components 150, 152 together. Thus, the corresponding first and second positioning elements 154, 156 are configured to maintain a desired spacing 162 between the first and second blade components 150, 152. It should be understood that the desired spacing 162 can be uniform between the first and second blade components 150, 152 or non-uniform between the first and second blade components 150, 152.

In an embodiment, the first positioning element 154 of the first blade component 150 may be aligned with the second positioning element 156 of the second blade component 152 manually, e.g. by lifting on one of the blade components and aligning the component with the other until the first and second positioning elements 154, 156 are arranged and affixed together. Alternatively, the first positioning element 154 of the first blade component 150 may be aligned and secured with the second positioning element 156 of the second blade component 152 via machinery, such as via a customized specialty machine or robot or via the gantry 66 of the CNC device 60.

Referring back to FIG. 9, as shown at (106), the method 100 may also include permanently securing the first and second blade components 150, 152 together such that the desired spacing 162 is maintained between the first and second blade components 150, 152. For example, in one embodiment, the method 100 may include permanently securing the first and second blade components 150, 152 together via an adhesive 164.

More specifically, in one embodiment, as shown in FIG. 11, the first and second blade components 150, 152 may be permanently secured together via the adhesive 164 by first securing the corresponding first and second positioning elements 154, 156 together and then also filling the desired spacing 162 or gap with the adhesive 164. In other words, the adhesive 164 may be applied to surrounding areas of the positioning elements 154, 156 as well as directly atop the positioning elements 154, 156 such that after the positioning elements 154, 156 are temporarily secured in place, the positioning elements 154, 156 become permanent once the adhesive 164 cures. Thus, the first and second blade components 150, 152 can be easily secured together with a constant offset, under compression or tension, from each other. This prevents the adhesive 164 from spider ebbing by maintaining hold down pressure of the two mating surfaces and shearing of the adhesive 164.

In further embodiments, the positioning elements 154, 156 may be aligned together and after aligning and without allowing the aligned first and second positioning elements 154, 156 to move, the adhesive 164 may be injected into one or more gaps created by the desired spacing 162. Moreover, in an embodiment, before injecting the adhesive 164, the aligned first and second positioning elements 154, 156 may be inspected before injecting the adhesive 164 and if the alignment of the positioning elements 154, 156 is not sufficient, the blade components 150, 152 can be repositioned by detaching one or more of the positioning elements 154, 156 to allow for realignment. Thus, the first and second blade components 150, 152 may then be realigned and the first and second positioning 154, 156 elements may be repositioned and reinspected.

In alternative embodiments, the method 100 may include permanently securing the first and second blade components 150, 152 together via welding. For example, in one embodiment, the first and second blade components 150, 152 may be permanently secured together by welding the corresponding first and second positioning elements 154, 156 together and then subsequently welding the first and second blade components 150, 152 together.

More specifically, in an embodiment, as shown in FIG. 12, the first and second positioning elements 154, 156 may be constructed of a thermoplastic material such that the positioning elements 154, 156 can be thermoplastically (thermally) welded together for a permanent non-removable bond. In addition, in such embodiments, the first and second positioning elements 154, 156 may be corresponding snap-fit components 166, 168 having any suitable shape that fit together. In the illustrated embodiment of FIG. 12, for example, one of the snap-fit components 166, 168 may have a mushroom-shaped protrusion, whereas the other may have a recess having a shape that corresponds the mushroom-shaped protrusion. Thus, once the snap-fit components 166, 168 are fit together, they can be subsequently welding together as well to provide a permanent bond. In another embodiment, depending on the thermoplastic material used in the positioning elements 154, 156 and the thermoplastic material used in the skin material, the positioning elements 154, 156 may be welded to the skin prior to assembly at the joint/interface 158.

The thermoplastic materials as described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

In certain embodiments, the corresponding first and second positioning elements 154, 156 may remain part of the rotor blade 16, e.g. when the method 100 is complete. For example, in the embodiment of FIG. 12, the thermoplastic snap-fit components 166, 168 are welded together and remain part of the final rotor blade 16. In alternative embodiments, the corresponding first and second positioning elements 154, 156 may be removed after permanently securing the first and second blade components 150, 152 together. For example, in one embodiment, the corresponding first and second positioning elements 154, 156 may be Velcro that temporarily holds the first and second blade components 150, 152 together while the adhesive cures.

Reference will now be made to FIGS. 13-16 to explain further embodiments of the present disclosure. Referring specifically to FIGS. 13 and 14, in a particular embodiment, the first and second blade components 150, 152 may include the pressure side shell 44 and the suction side shell 46 and the interface 158 may include trailing edge 26 of the rotor blade 16. More specifically, as shown, the pressure and suction side shells 44, 46 may be formed of one or more outer skins 56 with an internal grid structure 62 secured thereto (e.g. via 3-D printing directly onto the skins 56 or adding the structure 62 between the skins). Further, as shown in FIG. 14, one or more internal skins 58 may be placed atop the internal grid structure 62 (FIG. 13) to form the overall shells 44, 46.

In such embodiments, as shown, the method 100 may include placing a V-shaped component 160 at the trailing edge 26, e.g. adjacent to the internal skins 58. For example, in one embodiment, the V-shaped component 160 may be constructed of a polymer material that can be easily extruded to form the part. As such, the shape of the V-shaped component 160 generally corresponds to the interior shape of the trailing edge 26. In addition, as shown, the corresponding first and second positioning elements 154, 156 may be placed and/or secured on opposing sides of the V-shaped component 160. Thus, as shown, the first positioning element 154 may be secured to the suction side shell 46 and the second positioning element 156 is secured to the pressure side shell 44.

Referring now to FIGS. 15 and 16, yet another embodiment of the present disclosure is provided. As shown, the interface 158 between the first and second blade components 150, 152 may be at the leading edge, such as the leading edge bond cap 70. Thus, as shown, the first and second positioning elements 174, 176 may be placed within a recess 178 that defines the desired spacing 162 such that the first and second positioning elements 174, 176 hold the components 150, 152 in place and also maintain the spacing 162 during assembly.

The skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, comprising:
a first blade component;
a second blade component secured to the first blade component at an interface; and,
at least one positioning element positioned at the interface of the first and second blade components, the at least one positioning element temporarily securing the first and second blade components together during assembly of the first and second blade components and then remaining part of the rotor blade when the assembly of the first and second blade components is complete, wherein the at least one positioning element maintains a desired spacing between the first and second blade components during assembly of the first and second blade components and in the rotor blade, wherein the at least one positioning element comprises a first positioning element and a second positioning element;
a weld between the first and second positioning elements; and
a weld between the first and second blade components, wherein the weld between the first and second positioning elements and the weld between the first and second blade components permanently secures the first and second blade components together.

2. The rotor blade of claim 1, wherein the first and second blade components of the rotor blade comprise at least one of a rotor blade shell, a spar cap, a leading edge, trailing edge, or combinations thereof, the rotor blade shell comprising at least one of a pressure side shell or a suction side shell.

3. The rotor blade of claim 1, wherein the corresponding positioning elements comprise at least one of recloseable fasteners, hook-and-loop fasteners, snap-fit fasteners, opposing sides of double-sided tape, one or more bump stops, or combinations thereof.

4. The rotor blade of claim 1, wherein the corresponding positioning elements are constructed from a thermoplastic material.

5. The rotor blade of claim 1, wherein the corresponding first and second positioning elements are internal of an outer aerodynamic surface of the rotor blade.

6. The rotor blade of claim 2, wherein the first and second blade components comprise the pressure side shell and the suction side shell and the interface comprises a trailing edge of the rotor blade, the rotor blade further comprising:
a V-shaped component provided at the trailing edge, wherein the corresponding first and second positioning elements are positioned on one or more sides of the V-shaped component.

7. The rotor blade of claim 6, wherein the V-shaped component is constructed of a polymer material.

8. The rotor blade of claim 6, wherein the V-shaped component corresponds to an interior shape of the trailing edge.

9. The rotor blade of claim 6, wherein the first positioning element is secured to the suction side shell and the second positioning element is secured to the pressure side shell.

10. The rotor blade of claim 1, wherein the corresponding first and second positioning elements at the interface of the first and second blade components are printed on the corresponding first and second positioning elements at the interface.

11. The rotor blade of claim 1, wherein the corresponding first and second positioning elements at the interface of the first and second blade components are adhered to the corresponding first and second positioning elements at the interface.

12. The rotor blade of claim 1, wherein the corresponding first and second positioning elements at the interface of the first and second blade components are inserted into the corresponding first and second positioning elements at the interface.

13. The rotor blade of claim 1, wherein an adhesive is placed between the first and second blade components.

14. The rotor blade of claim 1, wherein the positioning elements comprise a mushroom-shaped protrusion and a shape that corresponds to the mushroom-shaped protrusion.

15. The rotor blade of claim 2, wherein either the pressure or suction side shell is formed from one or more outer skins with an internal grid structure secured thereto.

16. The rotor blade of claim 15 wherein one or more internal skins are positioned atop the internal grid structure to form either the pressure or suction side shell.

17. The rotor blade of claim 1, wherein the interface between the first and second blade components is at a leading edge bond cap.

18. The rotor blade of claim 13, wherein the first and second positioning elements are placed within a recess that defines a spacing such that the first and second positioning elements hold the first and second blade components in place and maintain the spacing during assembly.

* * * * *